United States Patent
Saito et al.

(10) Patent No.: US 7,194,377 B1
(45) Date of Patent: Mar. 20, 2007

(54) METHOD FOR CALIBRATING AN ANALOG SENSOR

(75) Inventors: Masashi Saito, Novi, MI (US); Brian Wightman, Davisburg, MI (US)

(73) Assignee: Hitachi Automotive Products (USA), Inc., Harrodsburg, KY (US)

( * ) Notice: Subject to any disclaimer, the term of this patent is extended or adjusted under 35 U.S.C. 154(b) by 0 days.

(21) Appl. No.: 11/235,388

(22) Filed: Sep. 26, 2005

(51) Int. Cl.
*G06F 15/00* (2006.01)

(52) U.S. Cl. .................... 702/145; 702/94; 702/142

(58) Field of Classification Search ............. 702/81, 702/94, 145, 147, 151, 96, 142; 318/138, 318/254, 439; 324/207.12, 207.25; 340/870.37
See application file for complete search history.

(56) References Cited

U.S. PATENT DOCUMENTS

| | | | | |
|---|---|---|---|---|
| 4,236,595 A | 12/1980 | Beck et al. | ................. | 180/243 |
| 4,635,743 A | 1/1987 | Riehl | ................. | 180/243 |
| 5,147,010 A | 9/1992 | Olson et al. | ................. | 180/197 |
| 5,680,308 A | 10/1997 | Warren | ................. | 364/424.098 |
| 5,699,870 A | 12/1997 | Warren | ................. | 180/247 |
| 5,754,967 A | 5/1998 | Inoue et al. | ................. | 701/54 |
| 6,492,911 B1 * | 12/2002 | Netzer | ................. | 340/870.37 |
| 6,591,179 B1 | 7/2003 | Check et al. | ................. | 701/91 |
| 6,642,684 B1 * | 11/2003 | Mirbach | ................. | 318/560 |
| 6,653,746 B2 | 11/2003 | Frenza et al. | ................. | 307/10.1 |
| 2002/0087288 A1 * | 7/2002 | Kim | ................. | 702/151 |
| 2002/0109501 A1 | 8/2002 | Schroeder | ................. | 324/207.21 |
| 2004/0100251 A1 | 5/2004 | Lohberg | ................. | 324/166 |
| 2004/0164733 A1 | 8/2004 | Fukaya et al. | ................. | 324/207.25 |
| 2005/0073297 A1 | 4/2005 | Walter et al. | ................. | 324/207.2 |

\* cited by examiner

*Primary Examiner*—Bryan Bui
(74) *Attorney, Agent, or Firm*—Gifford, Krass, Groh, Sprinkle, Anderson & Citkowski, P.C.

(57) ABSTRACT

A method for determining the absolute angle of an angle position sensor over a predetermined rotation range and in which the sensor generates a repeating periodic analog signal across the rotation range. The initial position of the sensor is stored in memory when the sensor is in a predetermined initial angular position. Thereafter, the angular position of the sensor within the rotation range is determined as a function of both the sensor output signal and the stored angular position of the sensor. The current position of the sensor is iteratively stored in memory. Additionally, the sensor output is calibrated by dividing the sensor output into a plurality of arc segments across the rotation range. A polynomial curve fit is then applied to each arc segment to determine the calibration for the sensor and this calibration data is subsequently utilized to provide a signal representative of the absolute angle of the position sensor over the rotation range.

20 Claims, 5 Drawing Sheets

METHOD FOR CALIBRATING AN ANALOG SENSOR

BACKGROUND OF THE INVENTION

I. Field of the Invention

The present invention relates generally to methods for determining the absolute angular position of a sensor which produces a repeating periodic analog sensor across a predetermined rotation range.

II. Description of Related Art

There are many different types of applications in industry where it is necessary to determine the absolute angular position of a rotatable actuator across a predetermined rotation range, e.g. 360 degrees. For example, in the automotive industry it is necessary to determine the position of a gearshift actuator and to accomplish automatic recovery of the position of the gearshift actuator upon energization or a power reset of the system. For example, such gearshift actuators are used for many vehicles to shift between two wheel and four wheel drive for the automotive vehicle.

There have been a number of previously known angular position sensors which produce an output signal representative of the angular position of the actuator. For example, in one type of angular sensor, a wiper is secured to and rotates in unison with the actuator. This wiper, in turn, slides across a resistive member so that the resistance between the wiper and one end of the resistive member varies as a function of the rotational position of the wiper and thus the rotational position of the actuator.

One disadvantage of this type of previously known position sensor, however, is that, due to the mechanical contact between the wiper and the resistive member, the sensor suffers mechanical wear, especially after protracted use. Such mechanical wear in the sensor can result in inaccurate and erratic readings from the sensor and even complete sensor failure.

In order to eliminate the mechanical wear of these previously known angular sensors, there have been previously known noncontact sensors. In one type of noncontact sensor, a permanent magnet is mounted to the rotatable actuator so that the permanent magnet rotates in unison with the actuator.

A sensor having a plurality of magnetic resistors is then mounted in alignment but not in contact with the permanent magnet attached to the actuator. These magnetic resistors are arranged in two bridges such that the magnetic resistors provide two sinusoidal output signals offset from each other by 45 degrees and which vary as a function of the angular position of the actuator.

A disadvantage of these previously known sensors utilizing magnetic resistors, however, is that they produce a repeating periodic signal for every 180 degree rotation of the actuator. Consequently, it has not been possible to utilize these previously known sensors with magnetic resistors where the rotation range of the actuator exceeds 180 degrees. This, in turn, necessitated the use of two or more sensors which is prohibitively expensive for many applications.

A still further disadvantage of these noncontact sensors which utilize magnetic resistors is that the sinusoidal output provided by the sensors was not true sinusoidal signals but, rather, approximations of sinusoidal signals. Consequently, even within the 180 degree angular range of the sensor, it was only possible to determine the position of the actuator with an accuracy of plus or minus a few degrees. In many applications, however, it is necessary to determine the absolute angular position of the actuator with greater accuracy, i.e. the absolute angle of the activation even though the absolute angle range of the actuator exceeds the periodic range of the sensor.

SUMMARY OF THE PRESENT INVENTION

The present invention provides a method for both calibrating a noncontact sensor which generates a repeating periodic analog output signal over a predetermined rotation range and for determining the absolute angular position of the actuator throughout that rotation range.

In brief, the sensor utilizes magnetic resistors which produce two substantially sinusoidal output signals which are phase offset from each other by 45 degrees. Preferably, the sensor utilizes magnetic resistors and the output signals from the sensor have a period of 180 degrees.

The sensor is first calibrated by connecting both the outputs from the sensor together and also the absolute angle information of the actuator from an absolute angle encoder as input signals to a processing circuit. The processing circuit is then programmed to divide the output signals from the sensor into a plurality of adjacent angular segments or areas and thereafter calculate a polynomial curve fit for the ratios of the sensor outputs for each angular segment. A relatively high degree of accuracy can be achieved by utilizing a third order polynomial curve fit and the constants for the coefficient of the polynomial curve fit for each angular segment are stored by the processing circuit in nonvolatile, i.e. persistent, memory.

Following calibration of the sensor, the actuator is returned to a predetermined position and that position is also stored in nonvolatile memory by the processing circuit.

Thereafter, in order to determine the absolute position of the actuator within the predetermined rotation range, the microprocessor utilizes the calibration data to determine the angular position of the actuator as a function of the sensor output. The processor also utilizes the previously stored position of the actuator as well as its direction of travel to determine the angular segment of the actuator and thus the absolute angle of the actuator.

For example, assuming that the output signals from the sensor repeat every 180 degrees and that the rotation range for the sensor is 360 degrees, if the output sensors indicate an angular position of 40 degrees, the absolute position of the actuator as determined by the sensor may be either 40 degrees or 130 degrees. In this case, if the previous position of the sensor as stored in nonvolatile memory was 35 degrees, then the absolute position of the sensor would be 40 degrees. Conversely, if the previously stored value of the angular position of the actuator was 125 degrees, then the absolute angular position of the actuator would be 140 degrees. In either event, the newly determined absolute angular position of the actuator is then stored in nonvolatile memory and the entire process is reiteratively repeated.

The present invention thus provides not only a highly accurate determination of the absolute angular position of the actuator but also extends the range of the angular sensor over two or even more periods of the sensor output.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
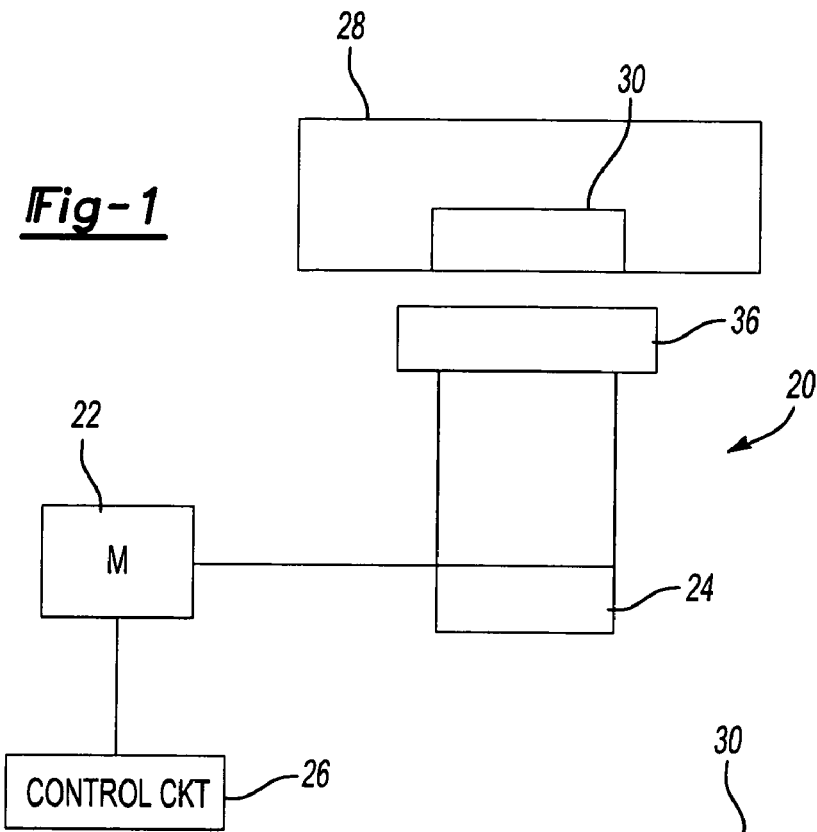
FIG. 1 is a diagrammatic view illustrating an actuator with a position sensor.

With reference first to FIG. 1, a rotary actuator 20 is there shown diagrammatically. The actuator 20 includes an actuating motor 22 which rotatably drives an actuator 24 throughout a predetermined rotation range, e.g. 360 degrees. A control circuit 26 is connected to and controls both the actuation and direction of actuation of the motor 22.

A sensor housing 28 is mounted to the actuator in any conventional fashion and includes a noncontact sensor 30. This noncontact sensor 30 is aligned with the actuator 24.

Figure 2:
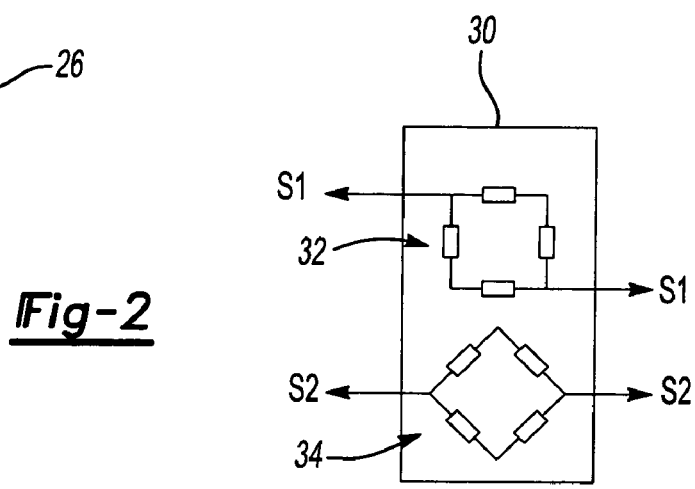
FIG. 2 is a top diagrammatic view of an exemplary sensor.

With reference now particularly to FIG. 2, the sensor 30 preferably comprises two full bridge circuits 32 and 34, each of which comprises four magnetic resistors. The bridges 32 and 34, however, are rotated 45 degrees relative to each other.

Figure 3:
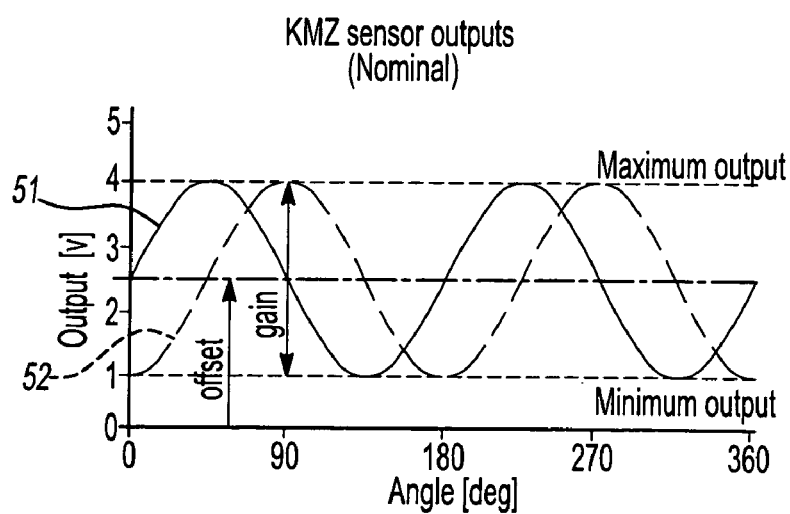
FIG. 3 illustrates the waveform from the sensor in FIG. 2.

With reference now to FIGS. 1–4, a permanent magnet 36 (FIG. 1) is attached to the actuator 24 such that the permanent magnet 36 is aligned with the sensor 30. Consequently, upon rotation of the actuator 24, the sensor generates two substantially sinusoidal signals S1 corresponding to the first bridge 32 and S2 corresponding to the second bridge 34. However, since the sensor bridges 32 and 34 are rotated 45 degrees relative to each other, the sinusoidal output signals from the sensor S1 and S2 are phase offset from each other by 45 degrees. Furthermore, as shown in FIG. 3, the signals S1 and S2 each have a period of 180 degrees so that the output signals S1 and S2 for the range of 1–180 degrees is substantially identical to the output signals S1 and S2 for the angular range 180–360 degrees.

Figure 4:
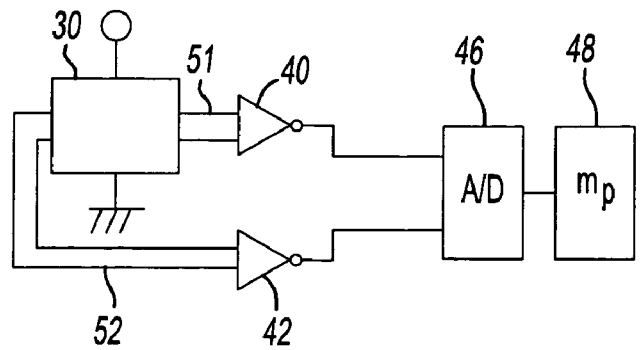
FIG. 4 illustrates a circuit utilizing the output from the sensor.

With reference now to FIG. 4, the output signals S1 and S2 are amplified by operational amplifiers 40 and 42, respectively, and coupled through an analog-to-digital converter 46 to a processing circuit 48. The processing circuit 48 is preferably microprocessor based and includes persistent memory such as nonvolatile memory.

In order to optimize the accuracy of the angular sensor over the rotation range, calibration of the sensor output signals S1 and S2 is required. This is accomplished by attaching the actuator 24 to an absolute angle encoder and connecting the output signals from both the absolute angle encoder as well as signals S1 and S2 as input signals to a processing circuit which may be the same as the processing circuit 48, or a completely different processing circuit used solely for calibration. In doing so, the value of both S1 and S2 throughout the entire rotation range is determined from the signal from the absolute angle encoder and this information is stored by the processing circuit in memory.

Figure 5:
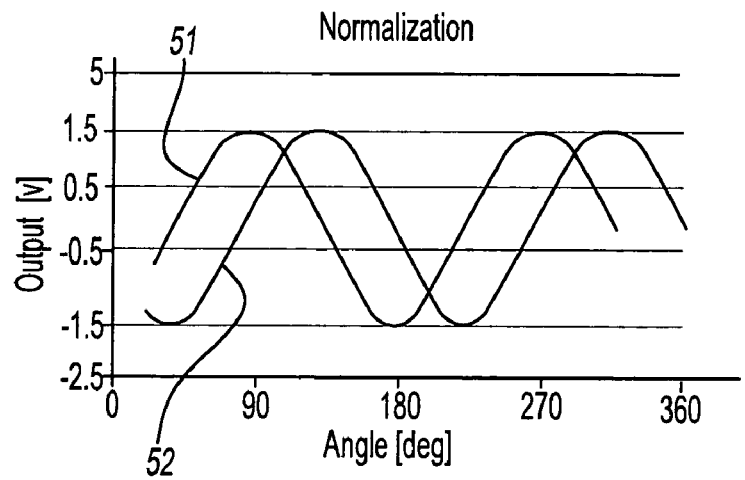
FIG. 5 is a view similar to FIG. 3, but illustrating the output signals as normalized output signals.

With reference now to FIGS. 3 and 5, the output signals S1 and S2 from the sensor 30 typically vary from a low voltage, e.g. 1 volt, to a higher voltage, e.g. 4 volts. In order to obtain the calibration data, the output signals S1 and S2 are first normalized as illustrated in FIG. 5 and the normalized values for S1 and S2 are also stored in memory.

Figure 6:
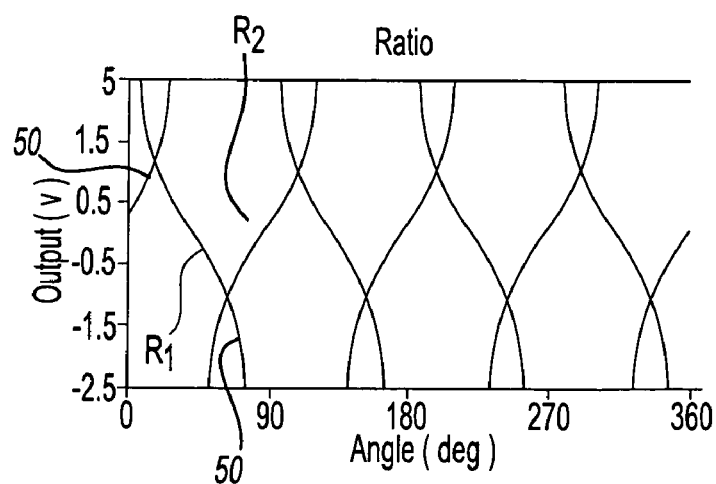
FIG. 6 is a waveform illustrating the ratios of the waveforms of FIG. 5.
Figure 7:
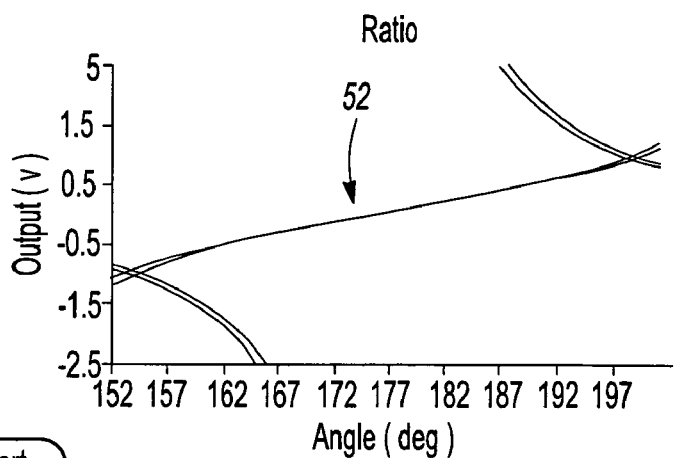
FIG. 7 illustrates a portion of FIG. 6 and enlarged for clarity.

With reference now to FIG. 6, the processing circuit then calculates a first ratio R1 which is equal to the normalized signal S1 divided by the normalized signal S2 (FIG. 3) throughout the rotation range. Similarly, a second ratio R2 equal to the (normalized signal S2)/(normalized signal S1) is calculated by the processing system and plotted across the rotation range. In doing so, the ratios R1 and R2 intersect, i.e. are equal to each other, at 45 degree increments throughout the rotation range. These intersections are depicted at 50 in FIG. 6 and effectively divide the rotation range of 360 degrees into eight adjacent angular segments 52 of 45 degrees each. These angular segments 52 are assigned area numbers 1–8 sequentially With reference now to FIG. 7, one exemplary angular segment 52 in area 4 is illustrated and extends from approximately 153 degrees to approximately 198 degrees. Furthermore, the output for the ratios R1 and R2 varies from about −1 volt to about 1 volt.

The processing circuit then calculates a polynomial curve fit of the normalized ratios S1/S2 and S2/S1 for each angular segment 52 throughout the entire rotation range, i.e. areas 1–8. Preferably, a third order polynomial curve fit is utilized for high accuracy so that the curve fit for each angular segment 52 will have the following format:

$$A \times X^3 + B \times X^2 + C \times X + D$$

where A–D are the coefficients of the polynomial equation. The constants A–D will almost certainly vary for the angular segments 52 or areas. Furthermore, the overall angular error of the sensor output can then be determined by the following equation:

$$\text{error} = \text{encoder\_angle} - (A \times X^3 + B \times X^2 + C \times X + D).$$

Following the calibration of the sensor output and the determination of the polynomial constants for each of the angular segments 52, these polynomial constants are stored by the processing unit in nonvolatile memory. The actuator 24 is then returned to a preset initial position and this preset initial position is also stored by the processing circuit in nonvolatile memory.

Figure 8:
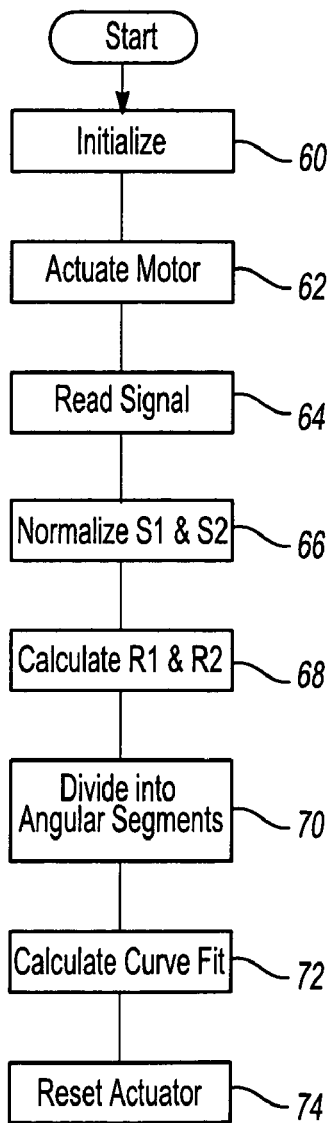
FIG. 8 illustrates a flowchart illustrating the operation of the present invention.

With reference now to FIG. 8, the entire calibration method is there summarized for clarity. At step 60 the actuator 24 is moved to an initial position and the absolute position encoder is attached to the actuator 24. Step 60 then proceeds to step 62.

At step 62, the motor is actuated to move the actuator 24 through the entire predetermined range. Simultaneously at step 64, the output signals S1 and S2 from the transducer 30 as well as the angular signal from the absolute encoder are stored in memory by the processing circuit. Step 64 then proceeds to step 66.

At step 66, the output signals S1 and S2 are normalized by the processing circuit and then at step 68 the ratios R1 and R2 corresponding to the normalized ratios S1/S2 and S2/S1 are calculated by the processing circuit. Step 68 then proceeds to step 70 where the processing unit divides the rotation range into eight adjacent angular segments or areas corresponding to the intersection of the ratios R1 and R2 calculated at step 68.

Step 70 then proceeds to step 72 where the processing unit calculates the polynomial curve fit for alternating R1 and R2 throughout the angular segments determined at step 70. Furthermore, all of the coefficients of the polynomial curve fit are stored in nonvolatile memory by the processing unit. The actuator 24 is then reset to an initial position at step 74 and that initial position is stored by the processing unit in nonvolatile memory thus completing the calibration of the actuator 20.

In order to determine the absolute position of the actuator 24, it is necessary to determine not only the angular position of the actuator 24 as a function of the now calibrated sensor output signals S1 and S2, but also which of the eight angular segments or areas the actuator is positioned in. In order to accomplish this, the absolute angular position of the actuator 24 is iteratively stored in nonvolatile memory and updated, along with the direction of rotation of the actuator 24, during operation of the actuator. Furthermore, since both the position and direction of travel of the actuator are stored in nonvolatile memory, this information remains accessible by the processing unit despite power interruption and/or power reset of the sensor circuitry. In addition, since limited continued motor rotation may occur despite a power interruption, it is possible that the actuator 24 continues to rotate up to a maximum rotation, e.g. 70 degrees, following a power interruption.

Therefore, by assigning an area number to each of the angular segments 52 in two sequential area numbers with area one equal to 0–45 degrees, area two equal to 45–90 degrees, and so forth, the current area or angular segment of the actuator 24 may be determined in accordance with the following table upon system restart and assuming rotation of the actuator in the clockwise direction:

| S1n | S2n | S1/S2 | S2/S1 | abs (S1/S2) | abs (S2/S1) | Previous Area | Area |
|---|---|---|---|---|---|---|---|
| <0 | | | >0 | | <=Vth | 8 or 1 or 2 or 3 | 1 |
| | >0 | >0 | | <=Vth | | 1 or 2 or 3 or 4 | 2 |
| >0 | | | >0 | | <=Vth | 2 or 3 or 4 or 5 | 3 |
| | <0 | >0 | | <=Vth | | 3 or 4 or 5 or 6 | 4 |
| <0 | | | >0 | | <=Vth | 4 or 5 or 6 or 7 | 5 |
| | >0 | >0 | | <=Vth | | 5 or 6 or 7 or 8 | 6 |
| >0 | | | >0 | | <=Vth | 6 or 7 or 8 or 1 | 7 |
| | <0 | >0 | | <=Vth | | 7 or 8 or 1 or 2 | 8 | where:

S1$n$=sensor output S1

S2$n$=sensor output S2

S1/S2=(sensor output S1)/(sensor output S2)

abs(S1/S2)=absolute value of S1/S2 abs(S2/S1)=absolute value of S2/S1

Previous Area=area number of previously stored area

Area=current area number of sensor.

Similarly, the current area of angular segment 52 of the actuator 24 upon system restart is determined in accordance with the following table during a counterclockwise rotation of the actuator 24:

| S1n | S2n | S1/S2 | S2/S1 | abs (S1/S2) | abs (S2/S1) | Previous Area | Area |
|---|---|---|---|---|---|---|---|
| <0 | | | >0 | | <=Vth | 7 or 8 or 1 or 2 | 1 |
| | >0 | >0 | | <=Vth | | 8 or 1 or 2 or 3 | 2 |
| >0 | | | >0 | | <=Vth | 1 or 2 or 3 or 4 | 3 |
| | <0 | >0 | | <=Vth | | 2 or 3 or 4 or 5 | 4 |
| <0 | | | >0 | | <=Vth | 3 or 4 or 5 or 6 | 5 |
| | >0 | >0 | | <=Vth | | 4 or 5 or 6 or 7 | 6 |
| >0 | | | >0 | | <=Vth | 5 or 6 or 7 or 8 | 7 |
| | <0 | >0 | | <=Vth | | 6 or 7 or 8 or 1 | 8 |

The above tables are represented by the following equations:

$$[i] \text{ or } [i-1] \text{ or } [i+1] \text{ or } [i+2] \text{ if CW direction} \quad (1)$$

$$[i] \text{ or } [i-2] \text{ or } [i-1] \text{ or } [i+1] \text{ if CCW direction} \quad (2)$$

where i equals the number of the previously stored area number upon system reset. Assuming clockwise rotation, the current area may be one less or up to two greater than the previously stored area while, similarly, for counterclockwise rotation, the current area must be not less than two nor more than one than the last stored area in the nonvolatile memory.

Figure 9:
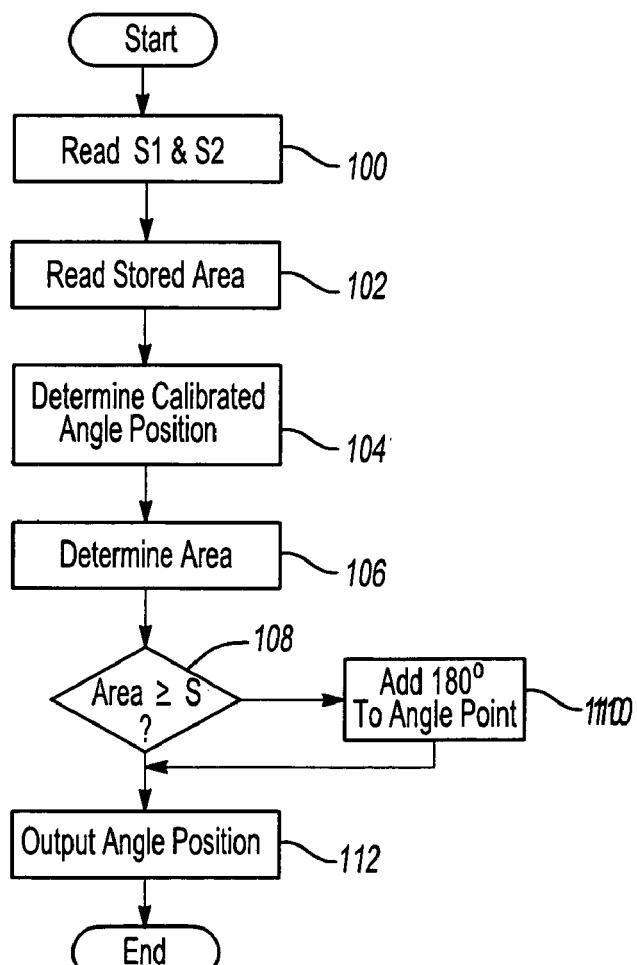
FIG. 9 is a flowchart illustrating a portion of the operation of the present invention.

With reference now to FIG. 9, a simplified flowchart illustrating the method of determining the absolute angle is shown. The sensor output signals S1 and S2 are first read at step 100 and the previously stored angular segment 52 or area is read at step 102. Once the area or angular segment has been determined at step 102 the absolute angle of the actuator 24 is determined at step 104 by reversing the calibration procedure. More specifically, step 104 first normalizes the signals S1 and S2 and determines the ratios R1 and R2 from the normalized signals S1 and S2. The previously stored polynomial curve fit coefficients A–D corresponding to the angular segment are then retrieved from memory. Thereafter, the absolute angle is calculated using the formula $AX+BX^2+CX+D$ where X equals the ratio R1 or R2, depending upon the angular segment 52 to yield the absolute angle of the actuator 24 within one period of 180 degrees. Step 104 then proceeds to step 106.

At step 106 the current area or angular segment 52 of the actuator 24 is determined as both a function of the previously stored area or angular segment of the actuator from step 102 and the direction of rotation of the actuator in accordance with equations (1) or (2) above. Step 106 then proceeds to step 108.

At step 108, the system determines if the current area determined at step 106 is greater than or equal to five. If so, the actuator 24 is in the second period of the sensor and, accordingly, branches to step 110 and adds 180 degrees to the calibrated angle determined at step 102. Step 110 then proceeds to step 112 and outputs the angle position of the actuator. Conversely, if the area determined at step 106 is less than five, step 108 then proceeds directly to step 112 and outputs the calibrated angle position determined at step 102.

Figure 10:
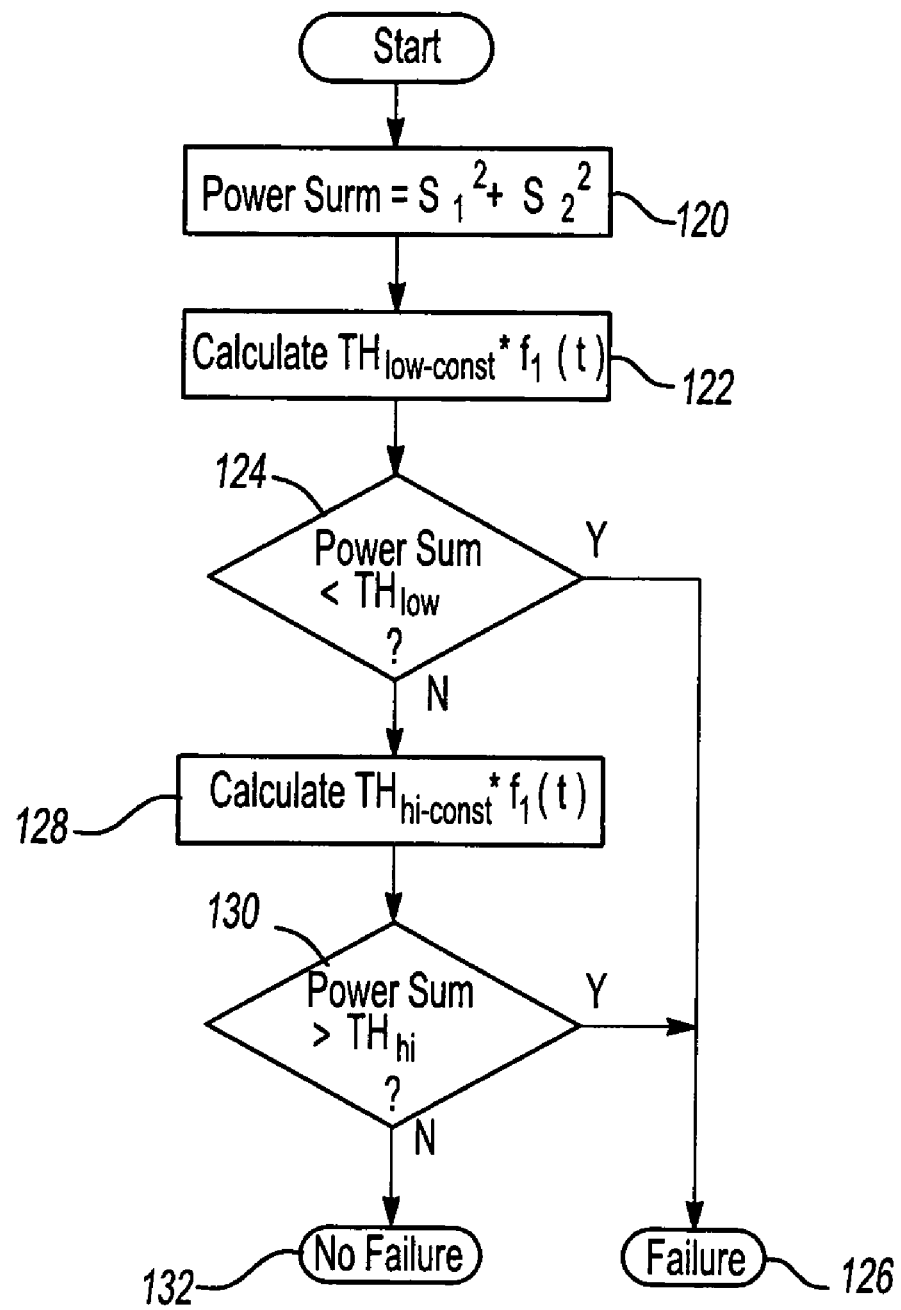
FIG. 10 is a flowchart illustrating a failure mode detection of the present invention.

In many situations, it is necessary to monitor the sensor circuitry to detect failure modes. One such failure mode may be the loss of one or both of the sensor output signals S1 and S2. With reference then to FIG. 10, one such failure detection method is illustrated. At step 120, the processing unit calculates a power sum equal to the normalized signal $S1^2$ plus the normalized signal $S2^2$. Step 120 then proceeds to step 122. At step 122, a low threshold value $TH_{low}$ is calculated by multiplying a stored low threshold constant $TH_{low-const}$ by a temperature function so that $TH_{low}= TH_{low-const} \times f_1(t)$ where t equals the ambient temperature. Step 122 then proceeds to step 124 which compares the power sum to the calculated low threshold $TH_{low}$. If the power sum is less than the adjusted low threshold $TH_{low}$, step 124 branches to step 126 indicating a failure mode. Otherwise, step 124 proceeds to step 128.

At step 128, the processing unit calculates a high threshold $TH_{hi}$ by multiplying a previously stored high threshold constant $TH_{hi=const}$ by a temperature function $f_h(t)$ so that $TH_{hi} = TH_{hi-const} \times f_h(t)$. Step 128 then proceeds to step 130 where the power sum calculated at step 120 is compared with the upper threshold $TH_{hi}$. If the power sum is greater than the upper threshold, step 130 branches to step 126 thus indicating a sensor failure. Otherwise, step 130 proceeds to step 132.

Figure 11:
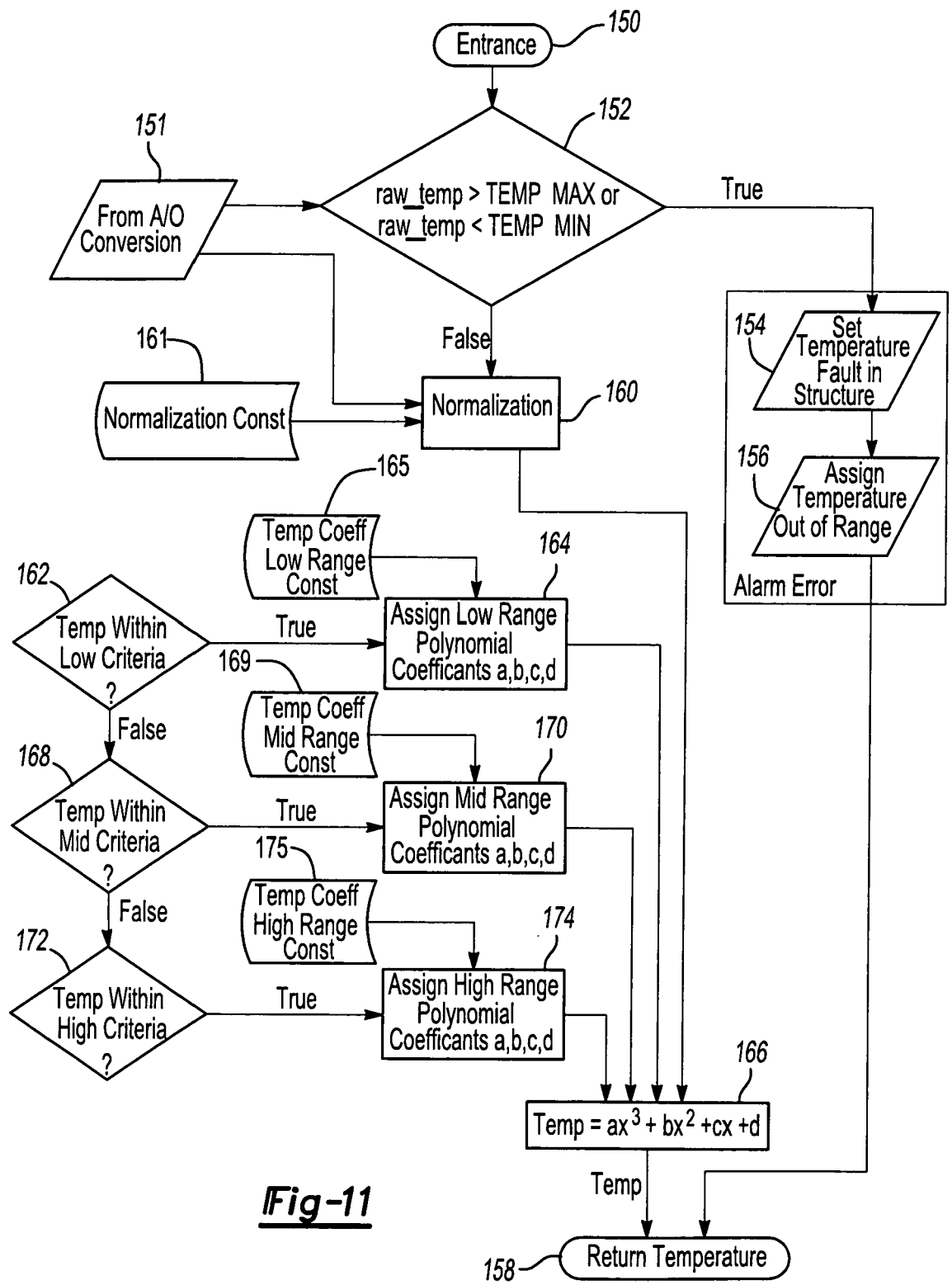
FIG. 11 is a flowchart illustrating the temperature determination of the present invention.

With reference now to FIG. 11, an exemplary method for adjusting the upper and lower thresholds for the power sum as a function of temperature is illustrated. The procedure begins at step 150 and then proceeds to step 152 where ambient temperature is compared with both a maximum and minimum temperature. If the raw temperature as determined by a temperature transducer is less than the temperature minimum or greater than the temperature maximum, step 152 proceeds to step 154 and sets an internal flag indicating a temperature failure. Such a temperature failure could occur for any of a number of reasons including, for example, failure of the temperature transducer. Step 154 then proceeds to step 156 and assigns a value that the temperature is out of range and preferably sets an error flag. Step 156 then exits from the procedure at step 158.

Conversely, assuming that the raw temperature determined at step 152 is within the upper and lower temperature thresholds, step 152 proceeds to step 160 where the temperature data obtained at step 151 is normalized into three different temperature ranges, namely a low temperature range, a mid temperature range and high temperature range by using previously stored normalization constants 161. It will be understood, of course, that fewer or more different temperature ranges may be utilized without deviation from the spirit or scope of the invention.

After normalization, step 160 proceeds to step 162 which determines if the normalized temperature is within the low temperature criteria. If so, step 162 proceeds to step 164 where polynomial coefficients A, B, C and D are read from memory 165. Step 164 then proceeds to step 166 where the temperature threshold is calculated from these polynomial coefficients.

Similarly, if the temperature is within the mid temperature range, step 162 instead branches to step 168. The polynomial coefficients A, B, C and D corresponding to a temperature within the mid temperature range are then read from memory 169 at step 170 and the temperature thresholds again calculated at step 166.

Likewise, if the temperature is within the high temperature criteria, step 168 instead proceeds to step 172 and then to step 174 where the polynomial coefficients A, B, C and D are read from memory 175 and then step 166 where the temperature is calculated as a function of those coefficients.

From the foregoing, it can be seen that the present invention provides a unique angular position sensor which enables the absolute position of the actuator to be accurately determined from a position transducer having a period less than the desired rotational range of the actuator. Having described our invention, however, many modifications thereto will become apparent to those skilled in the art to which it pertains without deviation from the spirit of the invention as defined by the scope of the appended claims.

We claim:

1. A method for determining the absolute angle of an actuator by an angular position sensor which generates a repeating periodic analog signal over a predetermined rotation range comprising the steps of:
   initially storing a current absolute angular position of the sensor in memory when the sensor is in a predetermined initial angular position,
   thereafter iteratively performing the following steps:
   (i) calculating the absolute angular position of the sensor in the predetermined rotation range as a function of the sensor output signal and an immediately previously stored current absolute angular position of the sensor, and
   (ii) storing the calculated absolute angular position of the sensor in memory as the current absolute angular position of the sensor for subsequent retrieval and use by a processor.

2. The method as defined in claim 1 wherein the actuator comprises an actuator used in an automotive application.

3. The method as defined in claim 1 and further comprising the steps of dividing the rotation range into a plurality of sequential angular segments, assigning an identifier to each angular segment, and wherein said step of storing the angular position of the sensor in memory further comprises the step of storing the angular segment identifier in memory.

4. The method as defined in claim 1 wherein the analog output from the sensor comprises a pair of offset sinusoidal signals and further comprising the steps of:
   normalizing said sinusoidal signals,
   calculating a sum corresponding to a sum of an exponential of said signals,
   comparing the sum to a value range between a lower threshold and an upper threshold, and
   generating an error signal when said sum is outside said range.

5. The method as defined in claim 4 and further comprising the step of adjusting said upper and lower thresholds as a function of ambient temperature.

6. The method as defined in claim 1 wherein the sensor is a noncontact magnetic sensor.

7. The method as defined in claim 1 wherein said calculating step further comprises the steps of:
   dividing the rotation range into a plurality of sequential angular segments,
   calculating constants for a polynomial curve fit representative of the position of the angle sensor for each angular segment,
   applying said calibration constants to the sensor output signal.

8. The method as defined in claim 7 wherein the sensor produces two sinusoidal output signals S1 and S2 as a function of the rotational position of the actuator, said signals being phase offset from each other, and wherein said calculating step comprises the steps of:
   normalizing signals S1 and S2,
   calculating ratios R1=S1/S2 and R2=S2/S1, and
   wherein said dividing step comprises the step of dividing the rotation range into angular segments defined between intersections of R1 and R2.

9. The method as defined in claim 8 wherein said step of calculating constants for said polynomial curve fit comprises the step of calculating said constants for the values of R1 and R2 for alternating angular segments.

10. A method for determining the absolute angle of a sensor which generates a first sinusoidal signal and a second sinusoidal signal as a function of the rotational position of an actuator throughout a preset rotation range, said first and second signals being phase offset from each other, said method comprising the steps of:

dividing said rotation range into a plurality of angular segments, calculating a polynomial curve for each said angular segment, storing parameters which define each said polynomial curve in memory, and determining a current angular segment of the sensor within the present rotation range, calculating the absolute rotational position of the sensor within the present rotation range as a function of said sensor output signals and said stored parameters for said polynomial curve corresponding to the current angular segment of said sensor; and storing said absolute rotational position in memory for subsequent retrieval and use by a processor.

11. The method as defined in claim 10 wherein said first sinusoidal signal and said second sinusoidal signal are offset by 45 degrees and wherein said angular segments are delineated by the intersection of the ratio and inverse ratio of said sinusoidal signals.

12. The method as defined in claim 10 and further comprising the step of iteratively storing the current angular position of the sensor in memory.

13. The method as defined in claim 12 and further comprising the step of, upon system restart, determining the angular position as a function of said stored angular position and said sensor output signals.

14. The method as defined in claim 10 and comprising the step of normalizing said sensor output signals prior to said first mentioned calculating step.

15. The method as defined in claim 10 wherein said determining said polynomial curve fit further comprises the step of determining a third order polynomial curve fit.

16. A method for determining the absolute angle of a rotary sensor within a rotation range wherein said sensor generates a varying analog signal as a function of the angular position of the sensor, said method comprising the steps of:

calibrating the sensor by dividing the rotation range into a plurality of adjacent angular segments, determining a polynomial curve fit corresponding to sensor output signal for each angular segment and storing parameters which define the polynomial curve fit for each angular segment in memory, determining the angular segment of the sensor, thereafter calculating the absolute angular position of the sensor as a function of the sensor output signal and the stored parameters for the polynomial curve fit corresponding the angular segment of the sensor; and storing said absolute angular position in memory for subsequent retrieval and use by a processor.

17. The method as defined in claim 16 wherein said sensor output signal comprises a pair of sinusoidal signals which are phase offset from each other, and wherein said calibrating step further comprises the steps of calculating the ratio and inverse ratio of said output signals over said rotation range, and assigning one said angular segment to each adjacent intersection of said ratios, said determining step further comprising the step of determining a polynomial curve fit of said ratios in each said angular segment.

18. The method as defined in claim 16 wherein said determining said polynomial curve fit further comprises the step of determining a third order polynomial curve fit.

19. The method as defined in claim 16 and comprising the steps of:

retrieving an upper and lower limit of said sensor signal as a function of ambient temperature, comparing said sensor signal to said upper and lower limits, and generating an error signal when said sensor signal is outside of said upper and lower limits.

20. Apparatus for determining the absolute angle of an actuator by an angular position sensor which generates a repeating periodic analog signal over a predetermined rotation range comprising:

means for initially storing a current absolute angular position of the sensor in memory when the sensor is in a predetermined initial angular position, means for calculating the absolute angular position of the sensor in the predetermined rotation range as a function of the sensor output signal and a previously stored current absolute angular position of the sensor, and means for iteratively storing the calculated absolute angular position of the sensor in memory as the current absolute angular position for subsequent retrieval and use by a processor.

* * * * *